United States Patent

[11] 3,619,604

| [72] | Inventors | John H. Auer, Jr.<br>Fairport;<br>Jerry P. Huffman, Rochester, both of N.Y. |
|---|---|---|
| [21] | Appl. No. | 885,520 |
| [22] | Filed | Dec. 16, 1969 |
| [45] | Patented | Nov. 9, 1971 |
| [73] | Assignee | General Signal Corporation<br>Rochester, N.Y. |

[54] DIGITAL DISTANCE TO COUPLING DETECTION
7 Claims, 3 Drawing Figs.

[52] U.S. Cl. .................................................. 246/122 R,
246/125, 324/111
[51] Int. Cl. ...................................................... B61l 25/02,
B61l 29/32
[50] Field of Search ......................................... 246/122 R,
125, 130; 324/111 X

[56] References Cited
UNITED STATES PATENTS
3,316,400 4/1967 Dosch et al. .................. 246/122 R X
3,478,348 11/1969 Molyneux..................... 324/111 X

*Primary Examiner*—Arthur L. La Point
*Assistant Examiner*—George H. Libman
*Attorney*—Harold S. Wynn ABSTRACT: Apparatus for detecting the impedance of an electrically energized track circuit has been provided wherein a receiver coupled to the track circuit at a reference point is responsive to received energy from the track circuit and means coupled to the receiver provides direct current signals representative of current and voltage components of the received energy. The improvement of the present invention includes an interface responsive to initiatory signals and to the direct current signals for providing an output signal, the occurrence of which relative to the initiation of the interface means gives indication of track impedance with respect to time.

The present invention relates to apparatus for detecting and transmitting information relative to the impedance of an electrical system and particularly to apparatus for detecting the impedance characteristic of a railroad track circuit in order to determine the distance from a reference point to a shunt occasioned by the presence of a railroad vehicle.

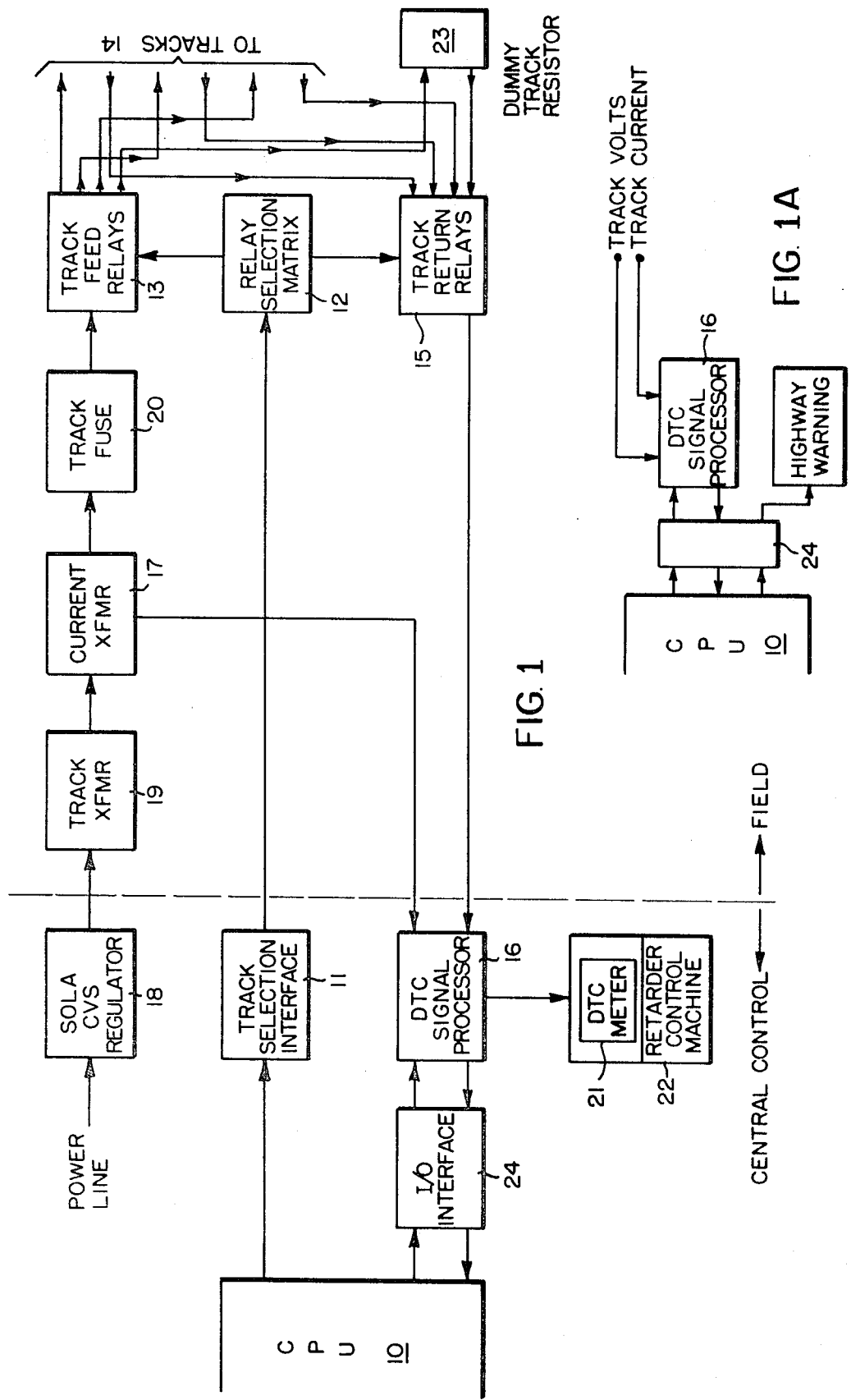

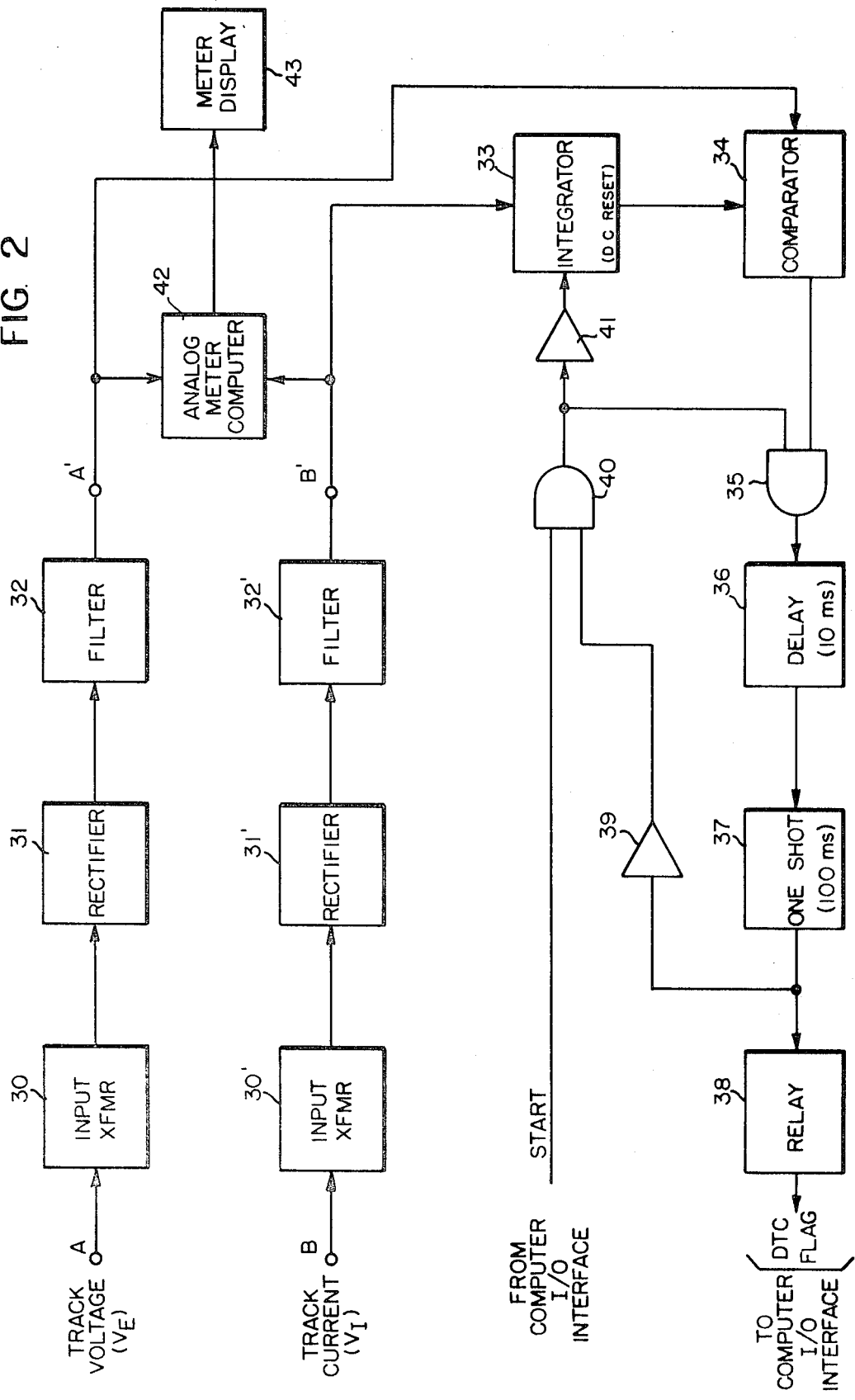

DIGITAL DISTANCE TO COUPLING DETECTION

BACKGROUND OF THE INVENTION

In order to automatically classify cars in a classification yard it is desirable to know how far a car must go before it will couple; that is, distance to coupling. One method used successfully in the past is to measure the impedance of the rails from some feedpoint as, for example, the end of a car retarder to the last axle of the last cut on the track. This is done by feeding a constant current usually in the range of 60 Hertz to the track and measuring the voltage across the track. The impedance of the track is not exactly linear with the distance, because of the effect of the ballast, but it is sufficiently linear to use for distance to coupling. One of the disadvantages of this type of arrangement is that, when digital computer equipment is employed in controlling yard operations and the like, complex analog to digital conversion equipment must be employed before distance information may be utilized by the computer. It would be desirable therefore to have an apparatus which would yield a signal indicative of distance to coupling in a way which can be fed into the computer.

Another disadvantage has to do with constant current sources. If a fixed current is impressed upon the tracks, then the voltage track will be directly related to the distance to coupling without the necessity for the measuring the current in the track circuit in order to determine the impedance of the rails. Generally, in classification yards, the distance to coupling system is shared among all the tracks in the yard by having a computer connect the system to the desired track through a relay matrix and then take a reading on that particular track. Because of the different lengths of the feed wires and tracks, it is difficult to maintain a constant current. The feed circuits in existing yards are servo systems consisting of a current sensing device and a motor-driven variac. A change in impedance is sensed by a change in current and the variac is then adjusted to return the current to the proper level. Since the system is electromechanical it takes a sizable amount of time to settle down after it has been connected to a track and it is also subject to mechanical wear. It would be desirable to have a system that measured both the current and voltage and take a ratio of the two to come up with a value for impedance. A system of this nature would not require the servo system, but only a device to measure the current, for example a current transformer. Such a system would also reduce the time necessary in switching from track to track in the various control operations.

It is therefore an object of this invention to provide a system which obviates the foregoing problems and limitations. It is another object of the invention to provide an apparatus for detecting the impedance characteristic of an electrical system and for producing a signal relative thereto which can be readily utilized by a digital computer.

It is another object of the invention to provide an interface between the apparatus to be monitored and the computer.

These and other objects of the present invention shall be discussed in the specification with reference to the following drawings.

DESCRIPTION OF THE DRAWINGS

FIG. 1 shows a block diagram of the complete system of the present invention including the central process computer.

FIG. 1A is a modification of the system of FIG. 1 for highway crossing protection.

FIG. 2 shows a block diagram of the distance to coupling signal processor incorporating the invention of the present disclosure.

SUMMARY OF THE INVENTION

There has been provided an apparatus for detecting the impedance to an electrical system including means when activated by an initiatory signal responsive to electrical signals in said system for providing voltage and current signals, and a converter means responsive to said current and voltage signals for providing an output signal which output signal provides indication of the impedance characteristics when measured in a timed relation to the initiatory signal.

There has also been provided an apparatus for detecting the impedance of an electrically energized track circuit wherein a receiver coupled to the track circuit at a reference point is responsive to received energy from the track circuit and means coupled to the receiver provides direct current signals representative of the current and voltage components of the received energy. The improvement includes interface means responsive to an initiatory signal and to the direct current signals for providing an output signal, the occurrence of which, relative to the initiation of the interface means gives indication of track impedance with respect to time.

DESCRIPTION OF THE PREFERRED EMBODIMENT

FIG. 1 shows a block diagram of the complete system. The digital computer central process unit 10 is used to process and transmit various controls to the different apparatus scattered throughout a typical classification yard system. The computer 10 receives information from various sources and provides outputs which activate various devices in the yard in accordance with a preselected program for the particular yard computer 10. It is to be understood that the information provided by the invention of the present disclosure can be used to compute in addition to distance to coupling, other valuable quantities of information. If the computer 10 receives reliable information as to the impedance of the track circuits involved, it can among other things compute by repeated measurements of the changing impedance of the track circuit, the rollability characteristics of a car, in a test track or can predict when a train or car will reach a certain point as in highway crossing prediction systems. However, it will be noted that the system described in FIG. 1 is an example of one of the many applications of the invention described herein and other applications can be readily shown once the information provided by the present device is produced.

The digital computer 10 selects a track 14 through a track selection interface 11 and a relay selection matrix 12. Track feed relay 13 controlled by the relay selection matrix 12 feeds 60 Hertz current to one of the tracks 14 and track return relays 15 responsive also to the relay selection matrix 12, sends the track voltage back to the distance to couple signal processing unit 16. Since a constant current track circuit is not being utilized in the present invention, a track current must also be sent back to the digital distance to couple signal processing unit 16. This is done by utilizing current transformer 17 which produces a voltage signal indicative of the current in the track circuit. The distance to couple signal processor 16 then computes the distance to coupling by taking a ratio of the track voltage to the current which yields an impedance which impedance is indicative of the distance to the nearest shunt from the feedpoint of the track circuit 14. The distance to coupling information is then transmitted through interface 24 to the computer 10 for processing and also to a meter 21 on a retarder control machine 22 located at the central control point for properly delaying or retarding the car passing through. A dummy track resistor 23 has a fixed impedance value and is periodically connected to the input of the DTC signal processor 16 for checking the operability of the DTC processor.

Power is transmitted to the tracks via a regulator 18 through the track transformer 19 and current transformer 17 to a suitable fuse 20 and through the track feed relays 13. The regulator 18 used for keeping the system stable and not necessarily for maintaining a constant current or constant voltage source on the tracks, since it is not necessary with the present invention.

FIG. 2 is a detailed drawing of the digital distance to coupling signal processor 16. Track voltage $V_E$ and track current represented by a voltage $V_I$ are fed into the processor 16 at terminals A and B via track return relays 15. Both of these voltages are transformed by input transformers 30 and 30' rectified by precision rectifiers 31 and 31' and filtered by the high speed filters 32 and 32' respectively. The precision rectifiers 31 and 31' are active element rectifiers and are used in order to compensate for voltage drops occurring in conventional passive element rectifiers, thus providing substantially no loss of input voltage. Hi-speed filters 32–32' also include active elements in order to reduce the settling time of the system.

The voltages appearing at points A' and B' represent DC values of the track voltage and track current characteristics. The DC voltage proportional to track current is fed into integrator 33 which is held reset except when a digital distance to coupling measurement is being made. The output of the integrator 33 goes to a comparator 34 along with the DC voltage which is proportional to the track voltage. The output of the comparator 34 is fed to an AND gate 35 which drives 10 ms. delay 36, a one-shot multivibrator 37 and an output relay 38. The output of the one-shot multivibrator 37 is inverted by inverter 39 back into one input of an AND gate 40 along with a start signal from the central processing unit 10. The output of the AND gate 40 goes to AND gate 35 and also is inverted by inverter 41 and used to reset the integrator 33.

The sequence of events for one reading of the distance to coupling would be as follows: the central process unit 10 would output a command calling for a particular track and then wait for a period of time, for example one second, to allow the system to settle down. During the setting time, the DC voltages proportional to track current and track voltage on the outputs of the high speed filters 32 and 32' respectively would reach the correct levels. After the initial delay for settling, the central process unit 10 would output the start signal. This start signal activates an AND gate 40 since the output of inverter 39 is present at the other input of AND gate 40. A signal at the output of AND gate 40 removes the DC reset from the integrator 33 through inverter 41 therefore the integrator 33 starts integrating at a rate directly proportional to track current $V_I$. The output of the integrator 33 goes to the comparator 34 which has as its second input, the track voltage $V_E$. When the output of the integrator 33 reaches a preset level in this case, the level of the track voltage, the comparator 34 generates an output.

It is the amount of delay from the time that the central process unit 10 generates from the start signal until the comparator 34 generates an output which is directly proportional to track voltage and inversely proportional to track current, and is therefore a measure of the track impedance. This can be seen from the following derivation. if $d=KZ_t$ 1. where $d$ is the distance to coupling
   K is a constant
   $Z_t$ is the impedance of the track circuit
   and if $Z_t=V_E/I$
2. where $V_E$ is the voltage of the track circuit
   I is the track circuit
   then substituting equations (1) into (2) yields
3. $d=KV_E/I$ now if $I=CV_I$
4. where C is another constant
   $V_I$ is a voltage representative of the track current
   then substituting (4) into (3) yields
5. $d=K_1(V_E/V_I)$
6. Where $K_1=K/C$ The integrator 33 and comparator 34 are used to set conditions for the system such that: 7.

$$V_E = \int_0^T V_I dT$$

where the interval from O to T is the time from the start pulse to the output pulse at comparator 34 when:
8. $V_E=V_I T$
   or
9. $T=V_E/V_I$
   Comparing equations (9) and (5) shows that
10. $d=K_1(V_E)=T$ 11. $\therefore d=T$ The derivation shows by the chosen equations 10 and 11 that the distance to coupling is directly proportional by some constant $K_1$ to the ratio of the voltages $V_E/V_I$ which is equal to the time T between the initial pulse and the output pulse at comparator 34. From this it can be seen that a measure of the impedance of the track circuit which is also a measure of the distance to coupling can be expressed in terms of time. This time or delay between a start pulse and a stop pulse can be readily utilized by the central process computer 10 without complicated analog to digital interface apparatus.

Other apparatus is included in order to provide a more stable system as will be explained in the following discussion. When the comparator 34 generates its output, both inputs of AND gate 35 are fulfilled, therefore a delay 36 is started. At the end of the delay 36, a one-shot multivibrator 37 is triggered, picking the output relay 38 generating a flag for the central processor unit 10. The output of the one-shot 37 also removes one input to AND gate 40 through inverter 39, thereby resetting the integrator 33 through inverter 41. As soon as the central processor unit 10 recognizes the flag, it removes the start signal from the AND gate 40. The delay from the beginning of the start signal to the generation of the output flag, minus the delay, 10 milliseconds in this example, and the relay operating time, is directly proportional to T, the track impedance, and therefore to the distance to couple. A requirement on the programming of the central processor unit 10 is that the start signal must be removed before the one-shot multivibrator 37 times out, or the system will continue to cycle and generate output pulses as long as the start signal is present. The purpose of AND gate 35 and the delay is for the situation where the car is shorting the track at or near the feedpoint. In this situation, the track voltage will be near zero and if the delay is not present the flag will be generated at the same time as the start signal and may possible cause some problem (that is the computer may miss the flag). The delay therefore, forces a minimum time between the start signal and the flag. The AND gate 35 is required because of the practical application of comparator circuits. At short distances when track voltage is less than the offset voltages, of the comparator and the integrator, it is possible for the comparator to generate an output even with the integrator being reset. AND gate 35 prevents the output of the comparator from generating a flag unless a start signal is also present. It also forces an output flag to be generated when the start signal appears even if the comparator is already generating an output at the time start signal is applied. An analog meter computer 42 is a circuit which generates a current which is directly proportional to the ratio of the track voltage to the track current and is therefore a direct measure of track impedance. This current may then be used to drive a meter and give a visual display to a yard operator of the distance to coupling which is shown by meter 43.

In a classification yard, it is important to know if a car is in motion when the distance to coupling reading is being taken. If the car is rolling, then the measured distance to coupling is not generally used and instead the computer uses a value for the distance to couple that is has stored away in memory. In order to determine motion, the computer takes at least two distance to coupling readings and if the two readings differ by more than a predetermined amount, then it is interpreted that a car is in motion, and the stored value for distance to coupling is used. The application of this system as described is only one of its possible applications, and it should not be limited as such. If for example, the computer 10 is programmed to produce start pulses and to frequently measure the track impedance as for example when a car is moving along the track circuit, then this changing value of impedance can be used to predict when the car will reach a particular point. Such a system could therefore be used to control and provide protection for highway and railroad grade crossings wherein a computer output may be used to generate a pulse for operating a railroad warning light or crossing gate as shown in FIG. 1A.

Track circuit and track voltage are inputs to DTC signal processor 16 and pulses from the computer 10 fed through interface 24, provide start signals at a predetermined rate. The impedance of the track circuit is determined by signal processor 16 and this information is processed by the computer 10 which computes the speed of the train and distance from the crossing (not shown) and provides an output to interface 24 for actuating warning signal 50 at uniform time before the time crossing.

Another such application would be in the case where this type of information would be derived from test sections in the classification yard and automatic yard feedback wherein the computer could be programmed to analyze the rolling characteristics of a number of cars and automatically make corrections to improve the yard operation.

The important features of the system are its speed, repeatability and interface simplicity. Speed, because the constant current track circuit is not necessary and therefore, the motor-driven variac is no longer required to be adjusted for each track measurement. Repeatability because the same variac can never be precisely returned to the same position as in a previous measurement and therefore, the current will never exactly be what it was in a previous reading. This degree of repeatability therefore makes the system more reliable and less susceptible to errors in programming and the like. The fact that the current does not have to be held constant, but is measured instead allows for the removal of the variac and also for the inherent problems associated therewith. As a result of the current measuring technique, the system becomes insensitive to such things as feed relay contact resistance. It is no longer necessary to remain connected to the track continuously as two distance readings are taken to detect motion. Rather, it is possible to take two readings separated by, for example, 5 or 10 seconds, and to take readings on other tracks during the intervals separating the two readings. This technique greatly increases the capability of the distance measuring system in new applications, such as body track surveillance or test section rollability measurement. The two-bit interface with central process unit 10, one out and one in, is very simple and inexpensive.

While there has been described what is at present considered to be the preferred embodiment of the invention, it will be obvious to those skilled in the art that various changes and modifications may be made therein, without departing from the invention, and it is, therefore, aimed in the suspended claims to cover all such changes and modifications as fall within the true spirit and scope of the invention.

What is claimed is:

1. Apparatus for detecting the impedance of an electrically energized track circuit wherein a receiver coupled to the track circuit at a reference point is responsive to received energy from said track circuit and means coupled to said receiver provides direct current signals representative of current and voltage components of the received energy, wherein the improvement comprises:

interface means responsive to an initiatory signal and the direct current signal for providing an output signal, including an integrator responsive to one of the direct current signals for producing a time variable signal changing at a rate relative to the magnitude of said direct current signal and;

comparator means responsive to said time variable signal and said other direct current signal for producing the output signal when the time variable signal achieves a predetermined relation to the other signal, whereby the occurrence of said output signal relative to the initiation of said interface means gives indication of track impedance with respect to time.

2. The apparatus of claim 1 wherein the time variable signal is a function of the current component of the received energy; and the other direct current signal is a function of the voltage component of the received energy.

3. Apparatus for providing a signal indicative of a distance from a feedpoint on a track circuit to the closest shunt occasioned by the presence of a railroad vehicle, and means for transmitting said signal to a computer including means coupled to the rails for generating an alternating current input signal and means responsive to received alternating current signals from the rails for providing direct current and voltage signals wherein the improvement comprises:

interface means initially activated by an initiatory signal, coupling the receiver means to the computer and responsive to said direct current and for voltage signals for providing an output signal at a time after said initiatory signal, including signal generating means responsive to one of the direct signals for producing a time variable signal having a rate of change relative to the magnitude of said direct signal input and comparator means responsive to the other of said direct signals and the time variable signal for producing the output signal when the magnitudes of said direct signal and time variable signal are in a preset relation, whereby said time duration between the initiatory signal and the output signal occurrences has a direct relation to the impedance of the track circuit, indicative of the distance to the shunt.

4. The apparatus of claim 3 wherein said signal generating means includes reset means responsive to the initiatory signal for initiating the generation of said time variable signal at a time, when called for by the initiatory signal.

5. The apparatus of claim 3 further comprising: output apparatus including a feedback path to said signal interface means providing a cutoff signal for deactivating said interface in a timed relation to the initiatory signal, said timed relation indicative of the impedance of the track circuit.

6. The apparatus of claim 5 wherein the output apparatus further includes a delay line for providing a preset delay time to the reception of the output signal by the computer.

7. The apparatus of claim 3 comprising:

means responsive to an initiatory signal and to one of said direct signals for providing a time variable signal relative to the magnitude of said direct signal, and comparator means responsive to the other of said direct signals and said timed varying signal for providing an output signal at a time interval after said initiatory signals when said time variable signal and said direct signal are in a preset relation to each other, said time interval providing information to the computer indicative of a relation between the two direct signals.

* * * * *